March 29, 1927. 1,622,491
L. COATALEN ET AL
MECHANISM FOR VARYING THE ANGULAR RELATIONSHIP OF TWO SHAFTS
RELATIVELY TO A THIRD
Filed April 26, 1926

L. Coatalen and S. H. Attwood
Inventors

By: Marks & Clerk
Attys

Patented Mar. 29, 1927.

1,622,491

UNITED STATES PATENT OFFICE.

LOUIS COATALEN AND STANLEY HERBERT ATTWOOD, OF WOLVERHAMPTON, ENGLAND.

MECHANISM FOR VARYING THE ANGULAR RELATIONSHIP OF TWO SHAFTS RELATIVELY TO A THIRD.

Application filed April 26, 1926, Serial No. 104,788, and in Great Britain April 6, 1925.

This invention relates to mechanisms for any purpose in which three shafts are connected together by gear wheels, and in which it is desired to vary the angular relationship of two of the shafts relatively to the third. One application of the invention is to internal combustion engines of the type in which oil fuel is intermittently injected into the engine cylinder or cylinders. The invention is then used for varying the positions in the cycle at which the oil is injected and the exhaust and inlet valves are actuated.

The invention comprises the transmission of motion from a driving shaft to two other shafts through a train of wheels part of which is capable of being moved epicyclically, together with means for varying the grouping of the wheels in the train, the arrangement being such that the same train can be used for varying the angular relationship of either, or one or both, of the two driven shafts relatively to the driver.

In the accompanying drawings:—

Figures 4, 4A:
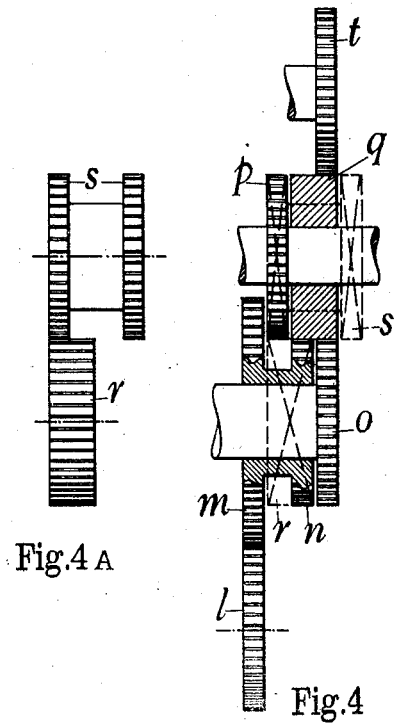

Figure 4ª is a front elevation of the epicyclic pinions only.

Figure 1:
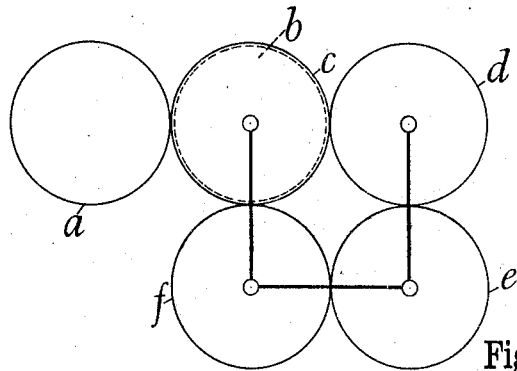
Figures 1 and 2 are side elevation and plan showing diagrammatically one manner of applying the invention to a mechanism by which the angular relationship of either of two shafts can be varied relatively to a third.
Figure 2:
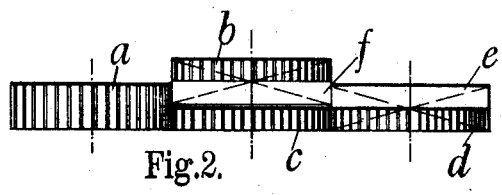

Referring to Figures 1 and 2, the following combination of wheels (of the same or different diameters) is used; $a$ a driving wheel on the driving shaft, $b$ a wheel on a shaft for actuating the injector or fuel valve mechanism of an engine, $c$ a freely rotatable and slidable wheel mounted coaxially with the said wheel $b$ on the shaft for actuating the injector mechanism, $d$ a wheel on the engine valve actuating shaft, and $e, f$ a pair of epicyclic wheels. Some of the wheels are of different widths. Thus $a$ is about twice the width of $c$, and the epicyclic wheels are about equal in width to $a$. The relative disposition of the wheels laterally is shown in Figure 2. For clearness of illustration the wheel $b$ in Figure 1 is shown of slightly smaller diameter than $c$, but it will be understood that $b$ and $c$ are of the same diameter.

The epicyclic wheels are respectively carried by a pair of links as indicated, these being pivoted coaxially with $c$ and $d$ and the ends of the links are connected together by a bar which has attached to it directly or indirectly an operating handle. By any suitable means the links carrying the epicyclic wheels can be fixed in any desired position. Further, any suitable means are employed for sliding the pinion $c$.

During normal operation of the valves and fuel injector the epicyclic wheels rotate on fixed axes and act only as idle wheels. Motion may then be transmitted from the driving wheel $a$ to $c$ and thence to $d$ and from the latter through the epicyclic wheels $e, f$, which mesh together, to the wheel $b$. When the wheels in the train are thus co-ordinated (which is the arrangement shown in Figure 2) angular adjustment of the wheel $b$ relatively to the driving wheel $a$, for altering the timing of the injector mechanism, is effected by giving an angular movement to the links, thus causing an epicyclic motion to be imparted through a suitable angle to the wheels $e, f$. Such angular movement has no effect on the wheel $d$ on the valve shaft.

The normal driving of the shafts can also be effected by another grouping of the wheels in the train. Thus $c$ by sliding it on its axis, may be disengaged from $d$ and engaged with $f$. Motion is then transmitted from $a$ to $b$ through $c$ and $f$, and from $a$ to $d$ through $c, f$ and $e$. With this combination an angular variation of $d$ relatively to $a$ for varying the timing of the valves, can be effected by means of the epicyclic wheels, without disturbing the setting of the injector mechanism.

It will be apparent that by varying the relative disposition or arrangement of the wheels the mechanism can be suited to different requirements. It will also be apparent that the terms injector and valve mechanisms are interchangeable in the above description.

By this invention we are able to effect variation of the timing of the oil injector mechanism and the valve mechanism of an engine in a very simple manner which is well adapted to practical requirements.

The invention is not limited to the example above described, neither is it limited to the use specified. The application of the invention to other uses is, however, in all cases essentially the same.

Figure 3:
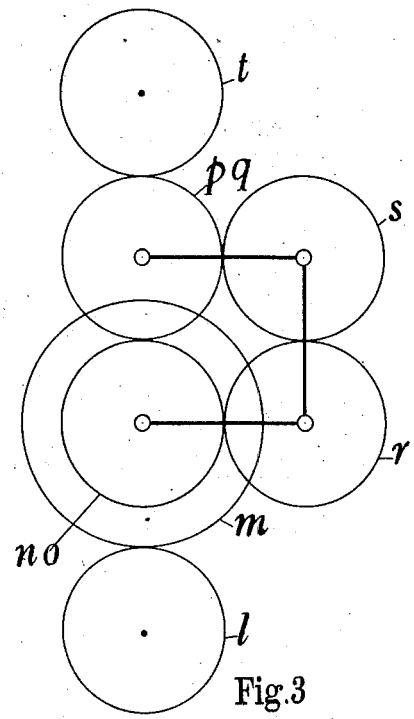
Figure 3 is a side elevation, and Figure 4 a front elevation showing diagrammatically one manner of applying the invention to a mechanism by which one or both or two shafts can be varied angularly in relation to a third.

When it is required to vary one or both, of two shafts relatively to a third, the arrangement shown in Figures 3, 4 and 4ª is used. The driver, which is indicated by $l$ and receives its motion from any other wheel or mechanism, gears with a wheel $m$, and with the latter is formed or secured another wheel $n$, these being coaxial with a wheel $o$ which drives the valve shaft. On the injector or fuel valve shaft are mounted two coaxial wheels $p$ and $q$, the former being secured to the shaft and the other free to rotate and slide on the shaft. The wheel $q$ may engage both $n$ and $o$ simultaneously as shown in Figure 4, or it may engage $o$ only. With $q$ engages another wheel $t$ on the pump shaft, and from this wheel or shaft motion may also be communicated to another train of wheels (not shown). The epicyclic pinion $s$ consists of two parts as shown in Figure 4ª these being separated by an intermediate groove or annular recess. When $q$ engages $n$ and $o$ it lies opposite the groove in the pinion $s$ and therefore does not engage either of its toothed portions. When it engages $o$ only, it also engages the right hand portion of $s$. The other epicyclic pinion $r$ engages $n$ and the left-hand portion of $s$. The epicyclic pinions are carried and movable by a link system similar to that already described.

With the various wheels in the positions shown in Figure 4, ordinary motion is communicated from $l$ through $m$, $n$, and $q$ to $o$, and also from $n$ through $r$ and $s$ to $p$. Movement of the epicyclic pinions by means of the links causes the angular relation of $p$ to be varied relatively to $l$ without affecting $o$. When $q$ is moved to the right so that it engages $o$ only and the right hand portion of $s$, ordinary motion is transmitted from $l$ through $m$, $n$ $r$, the right hand portion of $s$ and $q$ to $o$. The wheel $p$ is actuated as before. In both cases $t$ receives its motion from $q$. On moving the epicyclic pinions by means of the links, the angular relation of both $o$ and $p$, and the shafts to which they are secured, are varied relatively to $l$. Also the angular relation of $t$ to $l$ is varied. With this arrangement we are therefore able to vary either the angular relationship of the one wheel $p$ (and its shaft), or both $p$ and $o$ (as well as any additional wheels such as $t$ that may be employed).

Having thus described our invention what we claim as new and desire to secure by Letters Patent is:—

1. A mechanism for varying the angular relationship between two shafts relatively to a third shaft, comprising a driving shaft, two driven shafts, a gear train for driving said driven shafts from said driving shaft including three intermediate gears and a pinion secured to each driven shaft, a pair of said intermediate gears being carried by a linkage pivoted on said driven shafts and engaging each other, the third intermediate gear being freely and slidably mounted on one of said driven shafts and driven by the driving shaft, said third gear when in one position driving one of said driven shafts directly, the other driven shaft being driven through said pair of gears, the angular relationship between one of said driven shafts relatively to the other shafts being changed when the linkage is shifted angularly with respect to the driven shafts.

2. A mechanism for varying the angular relationship between two shafts relatively to a third shaft, comprising a driving shaft, two driven shafts, a gear train for driving said driven shafts from said driving shaft including three intermediate gears and a pinion secured to each driven shaft, a pair of said intermediate gears being carried by a linkage pivoted on said driven shafts and engaging each other, the third intermediate gear being freely and slidably mounted on one of said driven shafts and driven by the driving shaft, said third gear when in one position driving one of said driven shafts directly, the other driven shaft being driven through said pair of gears, and when said third gear is in a second position both of said driven shafts are driven through said gears, the angular relationship between both of said driven shafts relatively to the driving shaft being changed when said third gear is in said second position and the linkage is shifted angularly with respect to the driven shafts.

3. A mechanism for varying the angular relationship between two shafts relatively to a third shaft, comprising a driving shaft, two driven shafts, a gear train for driving said driven shafts from said driving shaft including three intermediate gears and a pinion secured to each driven shaft, a pair of said intermediate gears being carried by a linkage pivoted on said driven shafts and engaging each other, the third intermediate gear being freely and slidably mounted on one of said driven shafts and driven by the driving shaft, said third gear when in one position driving one of said driven shafts directly, the other driven shaft being driven through said pair of gears, and when said third gear is shifted to a second position one of said driven shafts is driven through one of said pair of gears, the other driven shaft being driven through both of said pair of gears, the angular relationship between one of said shafts relatively to the other shafts being changed when the linkage is shifted angularly with respect to the driven shafts.

In testimony whereof we have signed our names to this specification.

LOUIS COATALEN.
STANLEY HERBERT ATTWOOD.